United States Patent [19]

Ingle et al.

[11] 4,172,883

[45] Oct. 30, 1979

[54] METHOD OF PURIFYING METALLURGICAL GRADE SILICON EMPLOYING REDUCED PRESURE ATMOSPHERIC CONTROL

[76] Inventors: Robert A. Frosch, Administrator of the National Aeronautics and Space Administration, with respect to an invention by, William M. Ingle; Stephen W. Thompson, both of Phoenix; Robert E. Chaney, Scottsdale, all of Ariz.

[21] Appl. No.: 918,537

[22] Filed: Jun. 23, 1978

[51] Int. Cl.$^2$ .............................................. C01B 33/02
[52] U.S. Cl. .................................... 423/348; 423/149; 423/293; 423/417; 423/625
[58] Field of Search ............... 423/348, 149, 293, 625, 423/417

[56]  References Cited
U.S. PATENT DOCUMENTS

| | | | |
|---|---|---|---|
| 1,103,747 | 7/1914 | Fierz | 423/149 |
| 2,989,376 | 6/1961 | Schaefer | 423/349 |
| 3,034,886 | 5/1962 | Chambery et al. | 423/348 X |
| 3,097,068 | 7/1963 | Litz et al. | 423/348 |
| 4,045,541 | 8/1977 | Mercer | 423/149 X |
| 4,070,444 | 1/1978 | Ingle | 423/349 |

FOREIGN PATENT DOCUMENTS

| | | | |
|---|---|---|---|
| 625027 | 8/1961 | Canada | 423/348 |
| 1039752 | 9/1958 | Fed. Rep. of Germany | 423/348 |

*Primary Examiner*—Jack Cooper
*Attorney, Agent, or Firm*—Monte F. Mott; John R. Manning; Wilfred Grifka

[57]  ABSTRACT

A method wherein a quartz tube is charged with chunks of metallurgical grade silicon and/or a mixture of such chunks and high purity quartz sand, and impurities from a class including aluminum, boron, and the like, as well as certain transition metals including nickel, iron, manganese and the like. The tube is then evacuated and heated to a temperature within a range of 800° C. to 1400° C., whereupon a stream of gas comprising a reactant, such as silicon tetrafluoride, continuously is delivered at low pressures through the charge for causing a metathetical reaction of impurities of the silicon and the reactant to occur for forming a volatile halide and leaving a residue of silicon of an improved purity. Additionally, the reactant may include carbon monoxide gas, whereby impurites such as iron and nickel react therewith to form volatile carbonyls.

4 Claims, 1 Drawing Figure

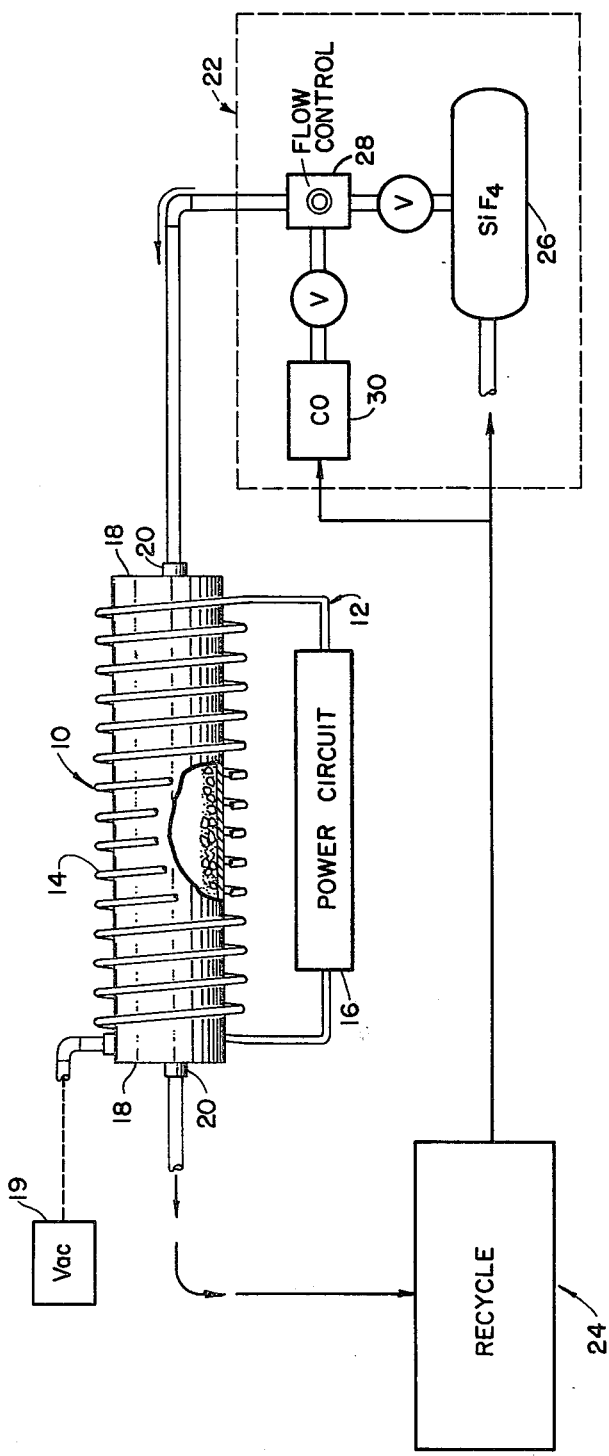

METHOD OF PURIFYING METALLURGICAL GRADE SILICON EMPLOYING REDUCED PRESURE ATMOSPHERIC CONTROL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to a process for use in purifying metallurgical grade silicon, and more particularly to a method of prepurifying metallurgical grade silicon through atmospheric control to remove a major portion of the impurities in producing silicon of a purity high enough for direct solar cell fabrication employing conventional Czochralski crystal growth processes.

2. Description of the Prior Art

Silicon solar cells, of course, are well known and have long been employed in celestial space environments. However, as is discussed in the instant inventor's prior U.S. Pat. No. 4,070,444, there recently has developed an increased interest in the use of photovoltaic silicon solar energy cells in the production of electrical energy for terrestrial uses. Unfortunately, the processes currently employed in obtaining silicon of a purity sufficient to fabricate such cells are relatively expensive, particularly in terms of the energy required in the production thereof.

Various attempts have been made to purify metallurgical grade silicon through chemical processes in which silicon halides are formed. For example, see U.S. Pat. Nos. 2,989,376 to Schaefer; 3,034,886 to Pruvot et al; and 4,070,444 to Ingle. However, the common approach has been simply to remove silicon from impurities.

It has been found possible to acquire a greater yield of silicon from metallurgical grade silicon, two or three times better than that obtainable when employing processes of the prior art, by removing impurities from the metallurgical grade silicon.

It is, therefore, the general purpose of the instant invention to provide an improved method for use in removing impurities from metallurgical grade silicon.

OBJECTS AND SUMMARY OF THE INVENTION

It is an object of the instant invention to provide an improved method for purifying metallurgical grade silicon.

It is another object to provide a method wherein metallurgical grade silicon is purified, employing reduced pressure atmospheric control, in removing impurities therefrom.

These and other objects and advantages are achieved through a method wherein a quartz tube is charged with chunks of metallurgical grade silicon and/or $SiO_2$ sand, heated to a temperature within a range of 800° C. to 1400° C., preferably 1300° C. to 1350° C., and treated with a stream of gas comprising silicon tetrafluoride and/or carbon monoxide for thus causing to occur a metathetical reaction of impurities with the gas leaving a residue of silicon of improved purity, and thereafter reacting the resultant compound with silicon monoxide for liberating the reactant, as will become more readily apparent by reference to the following description and claims in light of the accompanying drawing.

DESCRIPTION OF THE DRAWING

The FIGURE is a diagrammatic view illustrating a system typifying a system employed in performing a method which embodies the principles of the instant invention.

DESCRIPTION OF THE PREFERRED EMBODIMENT

With reference to the FIGURE, it is noted that the system includes a quartz tube, generally designated 10, having an inside diameter of one to four inches and an overall length of twenty-four to thirty-six inches. While the tube is illustrated in a horizontal disposition, it often is found convenient to support the tube 10 in a vertical orientation whereby the obvious advantages of gravitation is realized. Suitable heating means, generally designated 12, are provided for heating the quartz tube to a suitable temperature, preferably within a range of 800° C. to 1400° C. As illustrated, the heating means 12 comprises a resistance heating coil 14 connected to a suitable power circuit 16. However, it is to be understood that, where desired, the heating means 12 includes an RF coil. Of course, when employing an RF coil a graphite susceptor is provided for reasons well understood by those familiar with such devices.

The tube 10 is suitably capped at each of its opposite ends, designated 18 and is connected in communication with a source of vacuum 19. Suitable caps, not shown, provided for purposes of capping the tube include orifices coupled in communicating relation with the interior of the tube. A nipple 20 is employed at each end of the quartz tube 10 for connecting caps to a circuit for a reactant gas. The circuit includes a supply system generally designated 22, and a recycling system, generally designated 24. The purpose of the supply system 22 is to provide a reactant gas to the tube while the purpose of the recycling system 24 is to reclaim and return reactant gas to the supply system 22. In practice, the system 24 includes a bed of Amberlite which serves to absorb boron. However, where so desired, the system includes a distillation purification unit, not shown.

As shown, the supply system 22 includes a source of silicon tetrafluoride 26 connected to the quartz tube 10 via a flow control circuit 28. The flow control circuit 28, where so desired, also serves to connect a source of carbon monoxide to the quartz tube. Since the details of the supply system form no specific part of the instant invention and is of a convenient design, a detailed description thereof is omitted in the interest of brevity. However, it is to be understood that the system 22, in effect, is adapted to supply to the tube 10 a reactant gas and that the gas preferably comprises silicon tetrafluoride, or where so preferred, a mixture of silicon tetrafluoride and carbon monoxide.

For purposes of providing for a complete understanding of the instant invention, the following example is provided.

In a series of experiments, a quartz tube having an inside diameter of one to four inches was charged with one to five kilograms of metallurgical grade silicon. The metallurgical grade silicon was provided in the form of chunks of 0.1 to ten millimeters. The tube 10 was then evacuated and heated employing a resistance heating coil 14 to temperatures within a range of 800° C. to 1350° C. Thereafter, silicon tetrafluoride was passed through the charge for periods of four to twenty hours.

In one such experiment, the quartz tube was sectioned in four places and metallurgical grade silicon samples removed for analysis. The analysis revealed that the aluminum concentration of the metallurgical grade silicon had been reduced from 0.5% (five thousand ppm) to 2-3 ppm, or purification of greater than three orders of magnitude. Importantly, boron was reduced from 50 ppm to 3-5 ppm. Also, it was noted that a removal of titanium, barium, copper, magnesium and calcium occurred, although not extensive, it was apparent that such purification did occur.

A number of factors apparently affect atmospheric-control purification of the metallurgical grade silicon. The first step in the purification process appears to be a metathetical reaction of the impurity with the silicon tetrafluoride. In cases of aluminum and boron the following reactions occur:

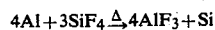

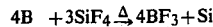

It is believed that the 12 Al-F or B-F bonds are formed at the expense of 12 Si-F bonds. In as much as the Al-F bond in AlF$_3$ is 17K cal/mole and the B-F bond in BF$_3$ is 38K cal/mole stronger than the corresponding silicon fluoride bond in silicon tetrafluoride, the reaction would be expected to proceed rapidly. Once aluminum trifluoride is formed it contacts a hot SiO$_2$ surface, the aluminum trifluoride forms silicon tetrafluoride and aluminum oxide. The aluminum oxide is deposited as a coating on the quartz, the major portion thereof being deposited within the tube. It also has been found, upon analysis, that boron, copper, calcium and magnesium are volatized and concentrated in the cooler zones outside the furnace.

It should be apparent that improved purification of metallurigical grade silicon through the use of silicon tetrafluoride, occurs for many elements. Even though little or no purification for the transition metals, such as iron, nickel, maganese, colbalt and so forth was found to occur, the process is viable when used in conjunction with a further purification process such as Czochralski crystal growth. Further, where so desired, a mixing of SiF$_4$ with CO gas permits the transition metals to form carbonyls which are volatile and thus may be removed from the tube 10 simultaneously with the halides. For example, it is known that nickel reacts with CO above 200° C. to form Ni (CO)$_4$ a volatile gas. Similarly, Fe, Mn and CO carbonyls may be formed and removed from the tube.

In view of the foregoing, it is believed to be apparent that the method of the instant invention provides a practical technique for removing main group elements from metallurgical grade silicon at lower costs and higher rates, whereby production of solar grade silicon is enhanced at greatly reduced costs.

What is claimed is:

1. In a method of purifying metallurgical grade silicon, the steps comprising:
    A. charging a quartz tube with chunks of metallurgical grade silicon containing impurities consisting essentially of aluminum and boron;
    B. heating the silicon to a temperature within a range of 800° C. to 1350° C. in vacuo;
    C. continuously passing through said chunks a stream of reactant gas at 0.1 torr to one atmosphere consisting essentially of silicon tetrafluoride to effect a metathetical reaction of aluminum and boron impurities of the silicon with the silicon tetrafluoride with AlF$_3$ and BF$_3$ being formed and leaving a residue of silicon of improved impurity; and wherein the AlF$_3$ formed reacts
    with the surface of the quartz tube to form silicon tetrafluoride and aluminum oxide which deposits as a coating on said surface.

2. The method of claim 1 wherein the chunks are of a size within a range of 0.1-10 mm, and the reactant gas is passed through said chunks for a period of four to twenty hours.

3. The method of claim 2 wherein the quartz tube is characterized by an inside diameter of 1-4 inches and a length of 24-36 inches.

4. The method of claim 2 wherein the impurities further contain nickel and the reactant gas further contains carbon monoxide and wherein the carbon monoxide reacts with the nickel to form volatile Ni(CO)$_4$.

* * * * *